United States Patent
Yoshinaga et al.

(10) Patent No.: US 6,607,296 B2
(45) Date of Patent: Aug. 19, 2003

(54) LENS IN VEHICULAR LAMP, METHOD OF SHAPING THE LENS AND AN APPARATUS FOR SHAPING THE LENS

(75) Inventors: Mituteru Yoshinaga, Shizuoka (JP); Makoto Sano, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/521,619

(22) Filed: Mar. 8, 2000

(65) Prior Publication Data

US 2002/0167816 A1 Nov. 14, 2002

(30) Foreign Application Priority Data

Mar. 8, 1999 (JP) .......................................... 11-059914

(51) Int. Cl.[7] .............................. F21V 5/00; B29D 11/00
(52) U.S. Cl. ...................... 362/520; 362/540; 362/360; 425/112; 264/1.7
(58) Field of Search ........................ 362/520, 331–332, 362/335, 540, 546, 549, 293, 360, 267; 359/642; 357/722; 425/808, 112; 264/1.7, 255

(56) References Cited

U.S. PATENT DOCUMENTS

| 5,642,228 A | | 6/1997 | Takezawa et al. ........... 359/642 |
| 5,721,039 A | * | 2/1998 | Yanagihara et al. ......... 428/172 |
| 5,756,013 A | * | 5/1998 | Yanagihara et al. ......... 264/1.7 |
| 5,922,369 A | * | 7/1999 | Yanagihara et al. ......... 425/572 |

FOREIGN PATENT DOCUMENTS

| JP | 7-186186 | | 7/1995 |
| JP | 7186186 | * | 7/1995 |

* cited by examiner

Primary Examiner—Sandra O'Shea
Assistant Examiner—Bao Q Truong
(74) Attorney, Agent, or Firm—Sughrue Mion, PLLC

(57) ABSTRACT

A lens 1, for use in a vehicular lamp, including a front section 4 directed generally to the front, a curved section 5 extending from the front section 4 and changing direction to face laterally and seal legs projecting generally to the back from the peripheral edges. The seal leg in the curved section has a portion that extends inwardly to form an undercut in the direction in which the lens is removed from a lens shaping mold. The curved section 5 is shaped from resin in at least two colors and the seal legs which at least form an undercut in the curved section are shaped from a resin having one of said at least two colors. Thus the lens can be shaped in a mold of a simplified structure.

8 Claims, 7 Drawing Sheets

LENS IN VEHICULAR LAMP, METHOD OF SHAPING THE LENS AND AN APPARATUS FOR SHAPING THE LENS

BACKGROUND OF INVENTION

This invention relates to a novel lens in a vehicular lamp, a method of shaping the lens and an apparatus for shaping the lens. More particularly, the invention relates to technology for simplifying a mold structure for shaping a lens in a vehicular lamp.

It is known by for example Japanese Patent Unexamined Publication No. Hei. 7-186186 to form a lens for use in a vehicular lamp that is shaped from resin in at least two colors so that it has at least two integral portions of different colors. See FIGS. 12 and 13 in which a lens is indicated by a. The lens a usually has seal legs k that project generally to the back from the peripheral edges to form joints to the lamp body (not shown). If the lens has a curved section c, the seal leg b in that section includes two portions, a first portion d1 that corresponds to a lens surface a1 of on color, and a second portion d2 that corresponds to a lens surface a2 of another color. The first portion d1 is shaped from a resin of the first color whereas the second portion d2 is shaped from a resin of the second color.

The seal leg b in the curved section c has a portion that forms an undercut in the direction in which the shaped lens is to be removed from a shaping mold. To shape this portion of the seal leg, a sliding mold e must be used. If the seal leg portions d1 and d2 in the curved portion are shaped from resins of the same colors as the corresponding lens surfaces a1 and a2 the sliding mold for shaping the undercut has to be used each time a resin of a particular color is injected. In addition, a partition f must be used to ensure that a resin being shaped in one color will not enter the space for shaping a resin of another color. This increases the complexity of the mold structure and the efficiency and frequency of the mold maintenance operation is lowered accordingly.

SUMMARY OF INVENTION

An object, therefore, of the invention is to simplify the structure of a mold for shaping a lens in a vehicular lamp.

In accordance with a first aspect, the invention provides a lens for use in a vehicular lamp, in which a curved section is shaped from resin in at least two colors and the seal legs which at least form an undercut in the curved section are shaped from a resin having only one of said at least two colors.

Conventionally, the seal legs in the curved section of a multi-colored lens for use in a vehicular lamp are shaped using as many sliding molds as the number of colors from which it is formed. In contrast, the seal legs in the curved section of the multi-colored lens of the present invention are shaped from a resin of only one color and, hence, only one sliding mold need be used with the resulting advantage of helping to simplify the lens shaping mold.

According to a second aspect, the invention provides a method of shaping a lens for use in a vehicular lamp which comprises the steps of injecting a resin of a first color into a mold cavity to shape a part of the lens surface in the curved section and all seal legs which at least form an undercut in the curved section and injecting a resin of a second color into the mold cavity to shape an overlying portion that covers at least a portion of the front surface of the seal legs in the curved section that have been shaped by injection of the resin of the first color.

In one embodiment of the method according to the present invention, a resin of the first color shapes a part of the lens surface in the curved section and all seal legs which at least form an undercut in the curved section. Therefore, a sliding mold need be used only when injecting the resin of the first color and multi-color shaping can be accomplished without using a sliding mold when injecting resins of the second and any subsequent colors. In addition, no partition need be provided. As a result, the lens shaping mold and, hence, the overall shaping process is simplified.

According to a third aspect, the present invention provides an apparatus for shaping a lens for use in a vehicular lamp which comprises a first mold for shaping a resin of a first color and a second mold for shaping a resin of a second color, said first mold having a cavity for shaping a part of the lens surface in the curved section and a cavity for shaping all seal legs which at least form an undercut in the curved section, and said second mold having a cavity for shaping the other parts of the curved section and a cavity for shaping an overlying portion that covers at least a portion of the front surface of the seal legs in the curved section.

Thus, the inventive apparatus shapes all undercuts in a mold for shaping a resin of the first color and, therefore, a sliding mold need be provided in only this mold for shaping a resin of the first color. In addition, no partition need be provided. As a result, the shaping mold is simplified.

BRIEF DESCRIPTION OF THE DRAWINGS

The above and other objects and advantages of the present invention will become more apparent by describing in detail preferred embodiments thereof with reference to the accompanying drawings, wherein.

DETAILED DESCRIPTION OF THE INVENTION

On the pages that follow, a lens of the invention for use in a vehicular lamp, a method for shaping the lens and an apparatus for shaping the lens are described with reference to the accompanying drawings.

Figure 1:
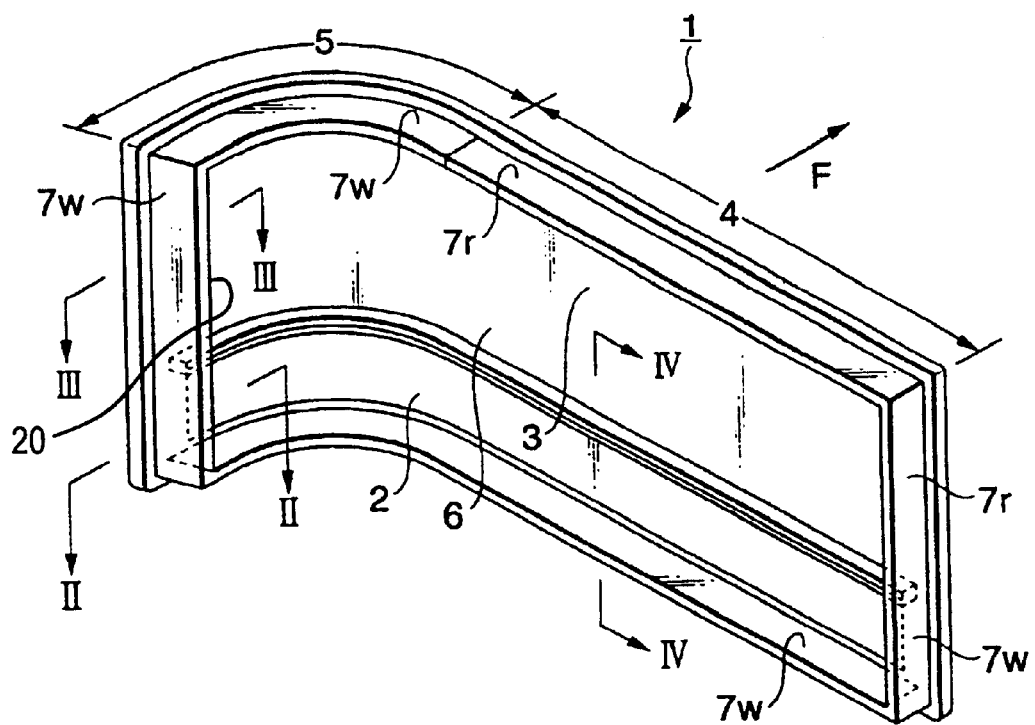
FIG. 1 is a perspective view, as seen from the back, of the lens of the invention for use in a vehicular lamp and, taken together with FIGS. 2–4, shows an embodiment of the lens.
Figure 2:
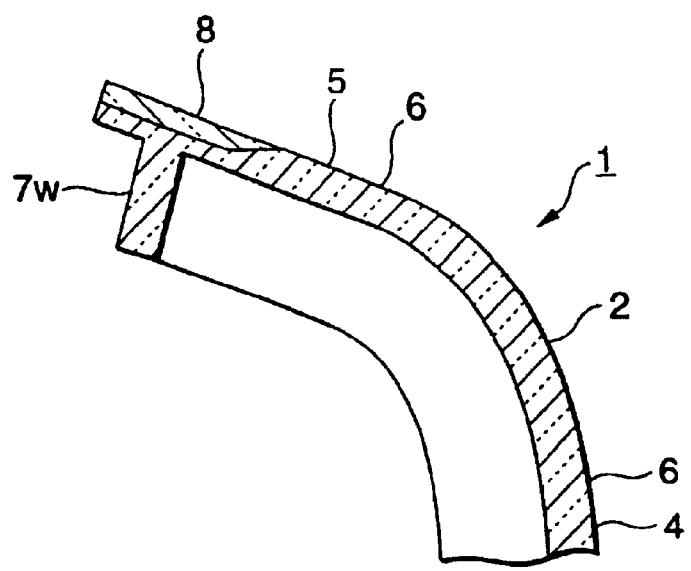
FIG. 2 is an enlarged section along line Il—Il of FIG. 1.
Figure 3:
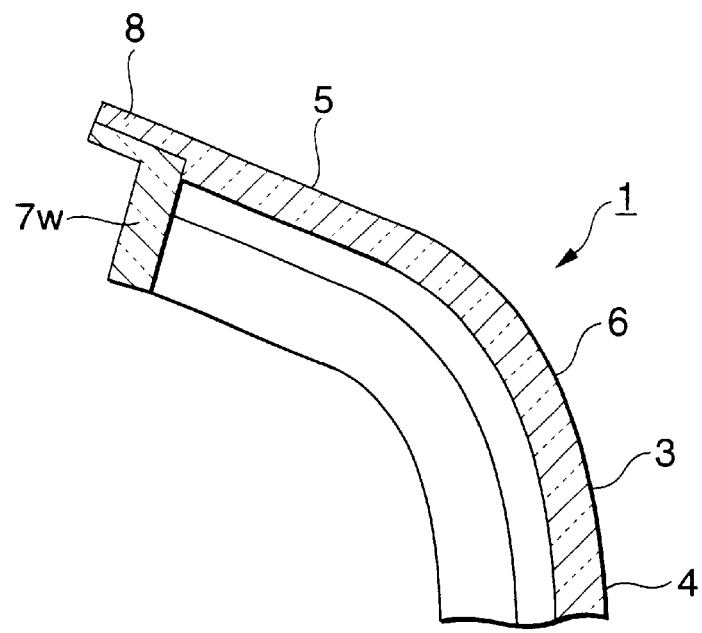
FIG. 3 is an enlarged section along line Ill—Ill of FIG. 1.
Figure 4:
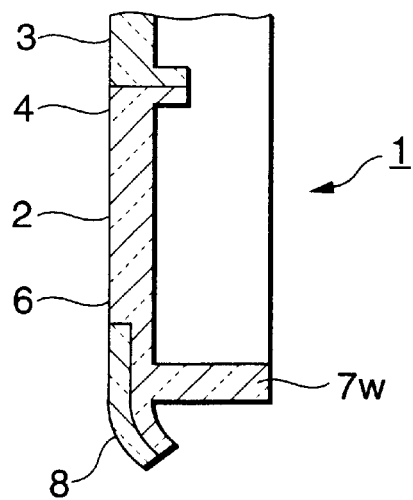
FIG. 4 is an enlarged section along line IV—IV of FIG. 1.

The lens indicated in FIG. 1 is generally formed of a transparent thermoplastic resin such as, for example, by an acrylic resin or a polycarbonate resin.

The lens 1 is an integral combination of two areas that are formed of resin in two colors, for example, a transparent area of a white color 2 and a transparent area of a red color 3. It includes a front section 4 that faces generally toward the front (in the direction of arrow F) and a curved section 5 that extends from the front section 4 and changes direction to face laterally. Formed integrally with these sections are seal legs that project generally to the back from the peripheral edges of a light issuing lens surface 6.

The seal legs include two groups, 7w formed of the white resin and 7r formed of the red resin. More specifically, the bottom portion which corresponds to the white resin-made area 2, the portion that is formed on the lateral edge remote from the curved section 5 and which corresponds to the white resin-made area 2, the portion that is formed in the curved section 5 and which forms an undercut in the direction in which the shaped lens is to be removed from a lens shaping mold, and the top portion which corresponds to the red resin-made area 3 and which is positioned in the curved section 5 are formed of the white resin. The other parts of the seal legs are formed of the red resin.

The front face of the seal legs 7w formed of the white resin is covered with an overlying portion 8 that is formed of the red resin. Hence, the lens 1 as seen from the front comes out red 1 along peripheral edges of the lens surface 6.

The process of shaping the lens 1 for use in a vehicular lamp will now be described.

Figure 5:
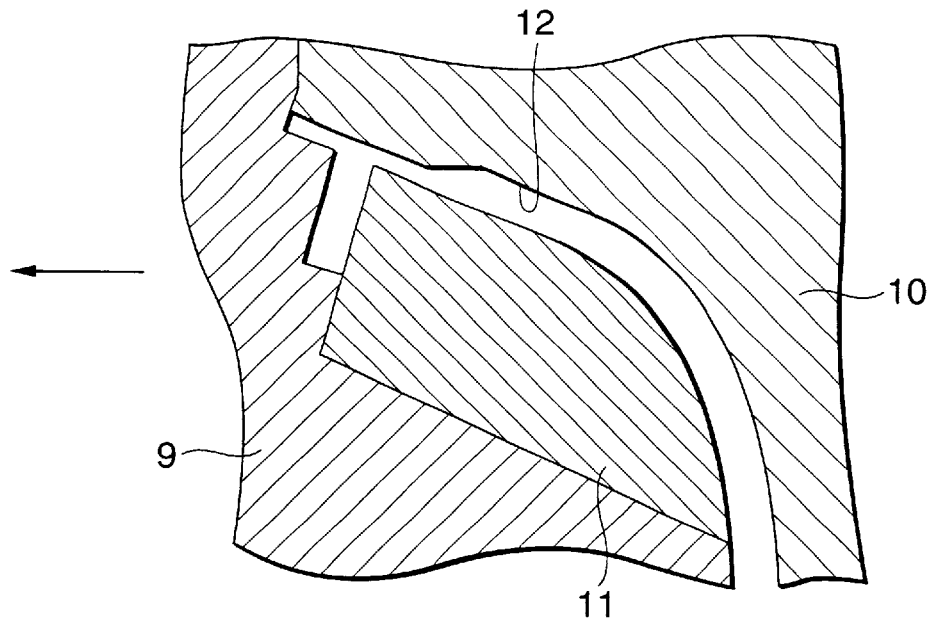
FIG. 5 is a section of the mold for forming the part shown in FIG. 2 and, taken together with FIGS. 6–8, shows the steps of shaping a portion from a resin of a white color with the mold being clamped.
Figure 6:
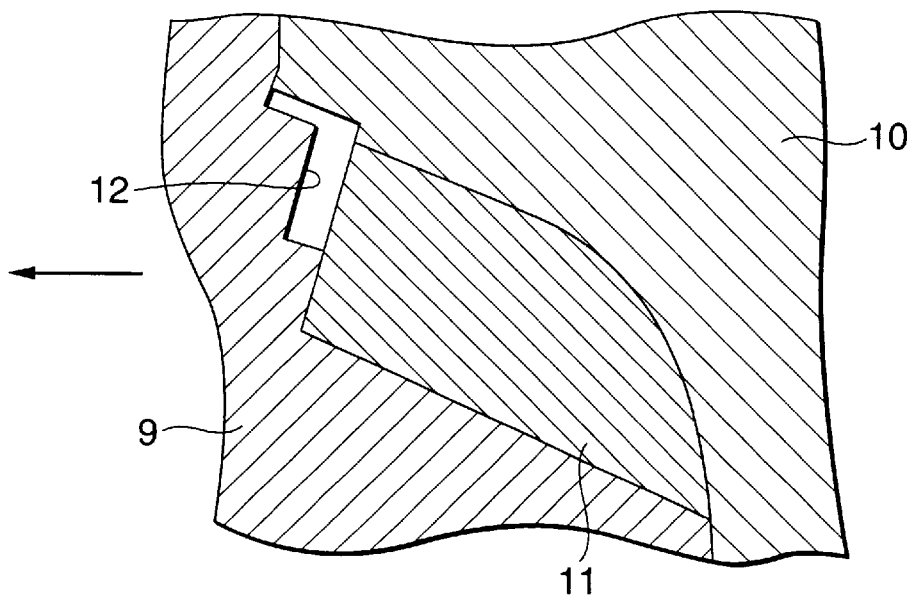
FIG. 6 is a section of a mold for forming the part shown in FIG. 3, with the shaping mold being clamped.
Figure 7:
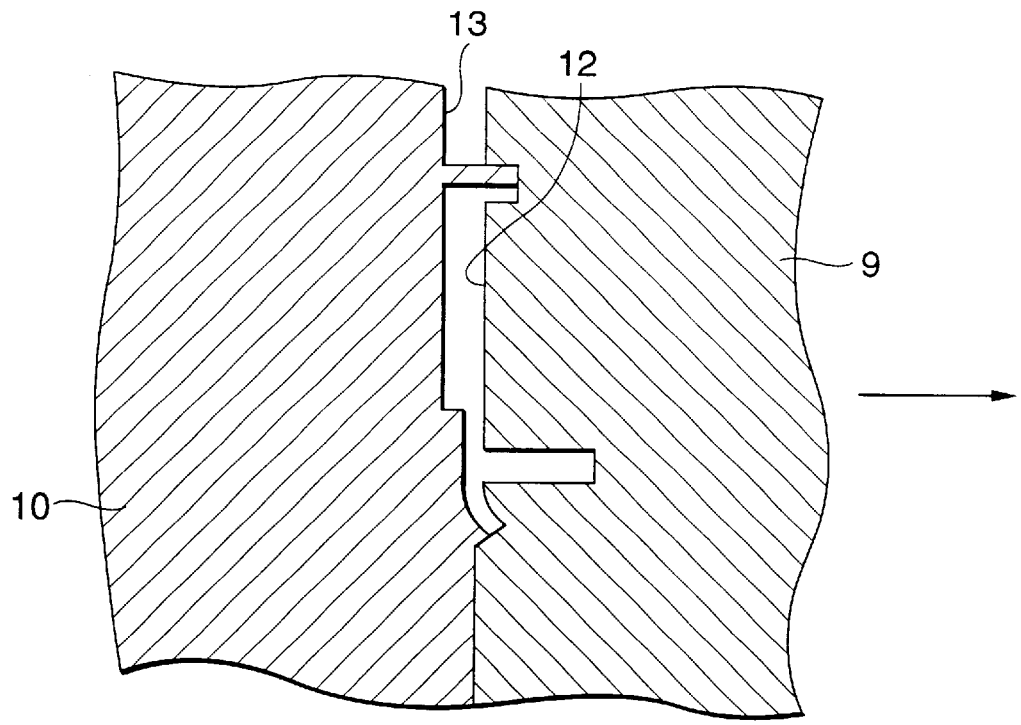
FIG. 7 is a section of a mold for forming the part shown in FIG. 4, with the shaping mold being clamped.

The process starts with the step of shaping the white resin. FIG. 5 shows the mold as it is in a clamped state. A movable die 9, a first fixed die 10 and a sliding mold 11 movably supported on the movable die 9 make up the first mold. A cavity 12 into which the white resin is injected is formed in the first mold. As shown in FIG. 7, by providing a space 13 isolated from the cavity 12, the movable die 9 and the first fixed die 10 can be held apart within the space 13. In this way, the mold, in particular the first fixed die 10, can have an area that need not have particularly high surface precision, with the resulting advantage of reducing the molds cost.

After setting the mold in the way described above, the white resin is injected into the cavity 12 to shape the white resin-made area 2 and the white seal legs 7w.

After cooling the injected white resin so that it solidifies, the movable die 9 is shifted in the direction of the arrow to open the mold. On the other hand, the sliding mold 11 in the movable die 9 is not moved, leaving the semi-molded article (with one color only) within the movable die 9.

Figure 8:
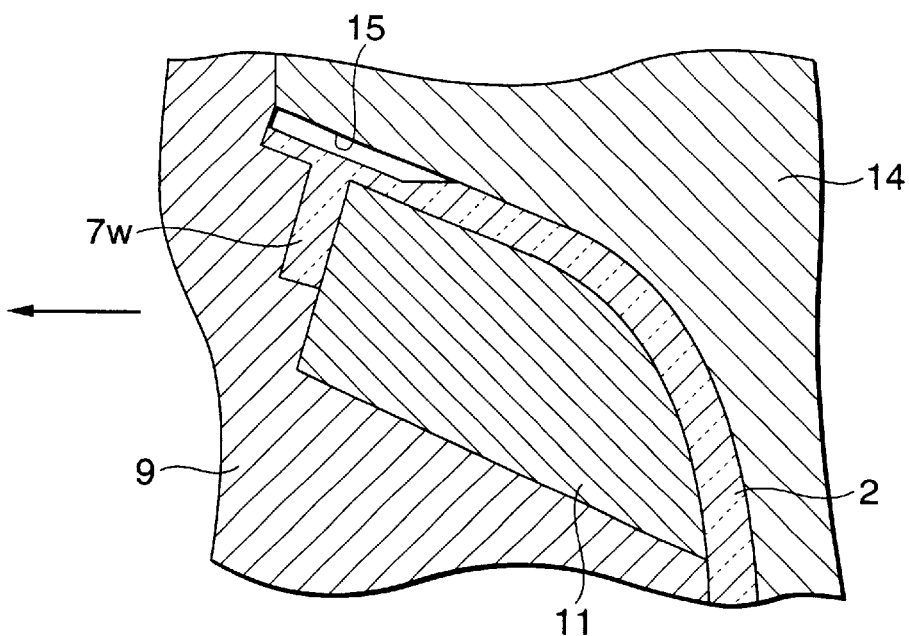
FIG. 8 is a section of a mold for forming the part shown in FIG. 2 and, taken together with FIGS. 9 and 10, shows the step of shaping a portion from a resin of a red color with the mold being clamped.
Figure 9:
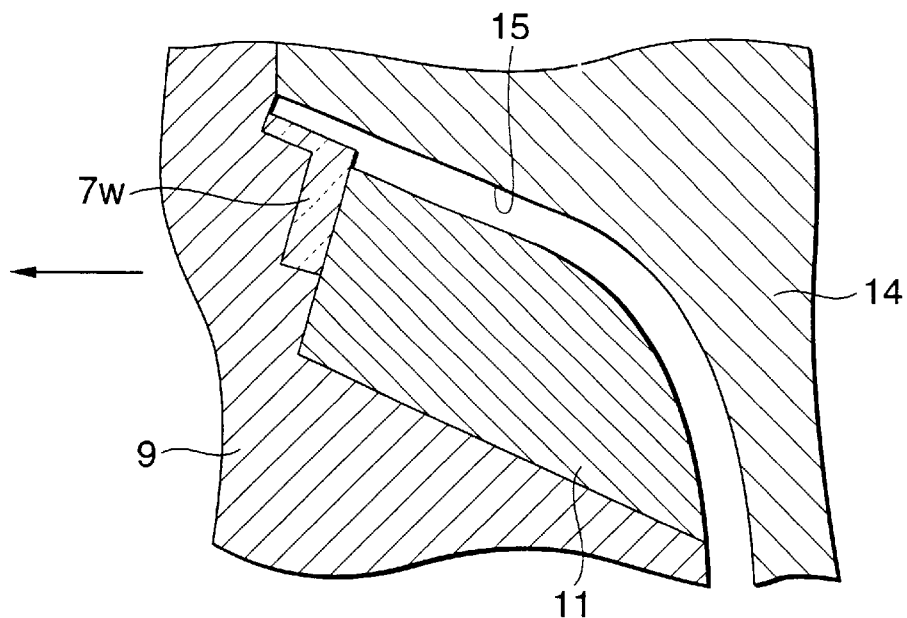
FIG. 9 is a section of a mold for forming the part shown in FIG. 3, with the shaping mold being clamped.
Figure 10:
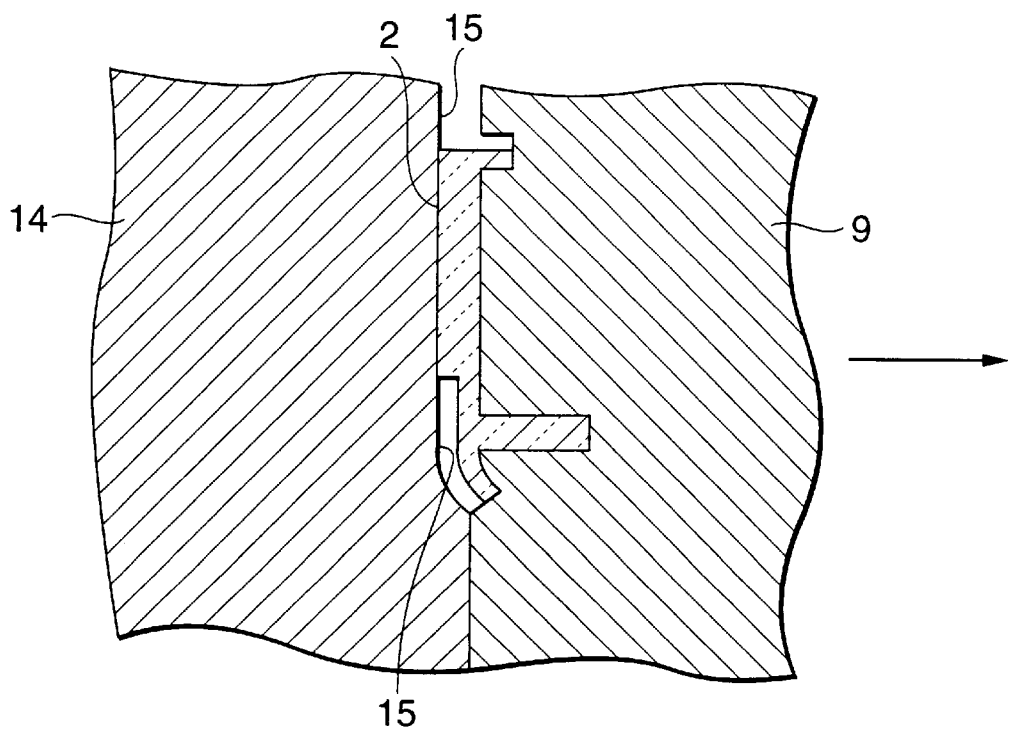
FIG. 10 is a section of a mold for forming the part shown in FIG. 4, with the shaping mold being clamped.

In the next step, the movable die 9 carries the semi-molded article and is brought into a face-to-face relationship with a second fixed die 14. Then the mold, including movable die 9 and second fixed die 14, is clamped. See FIGS. 8, 9 and 10. The movable die 9 and the second fixed die 14 form a cavity 15 into which the red resin is injected.

After setting the mold in the way described above, the red resin is injected into the cavity 15 to shape the red resin-made area 3 (see FIG. 9), the red seal legs 7r and the overlying portion 8. See FIGS. 8–10.

Figure 11:
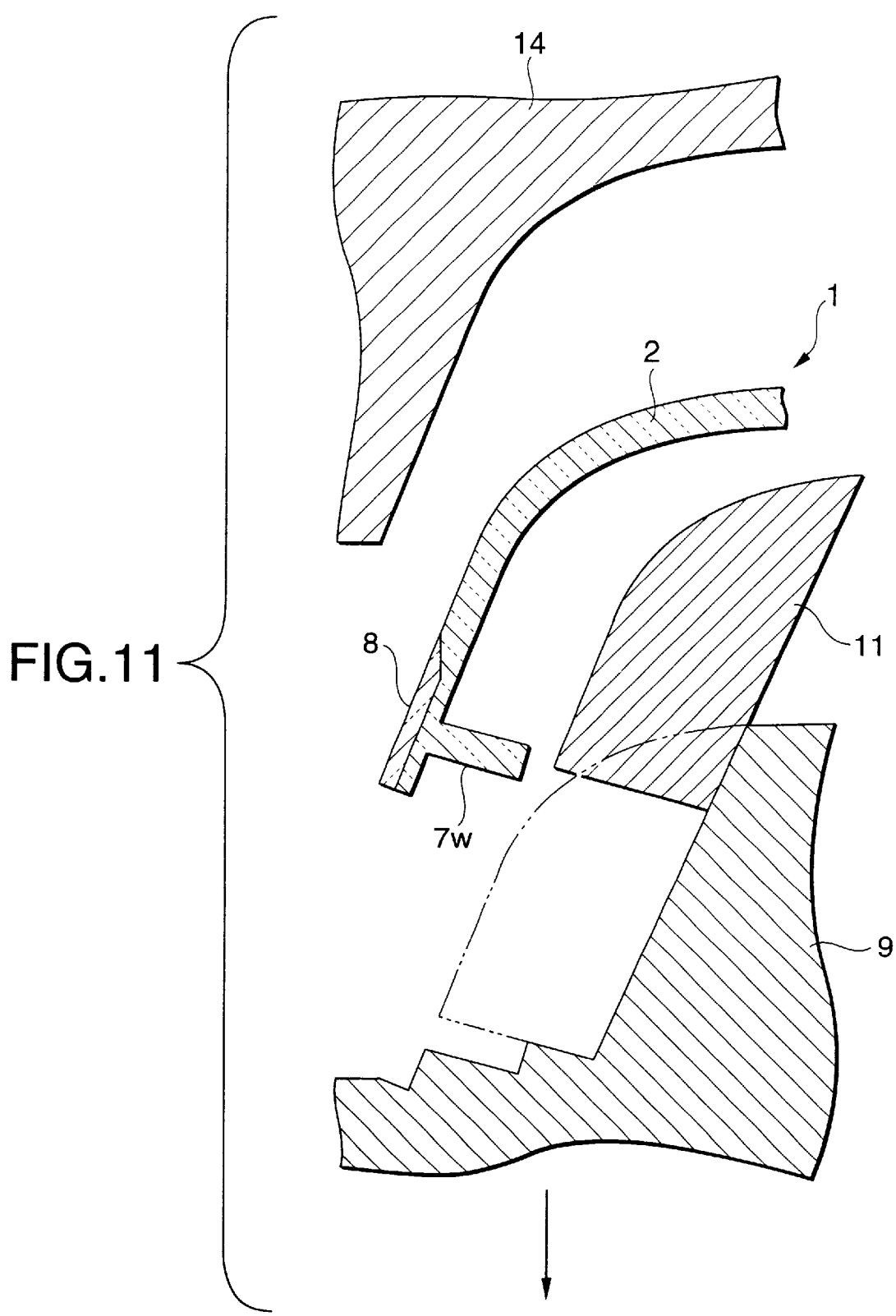
FIG. 11 is a section of the mold for forming the part shown in FIG. 8, with the shaping mold being opened.
Figure 12:
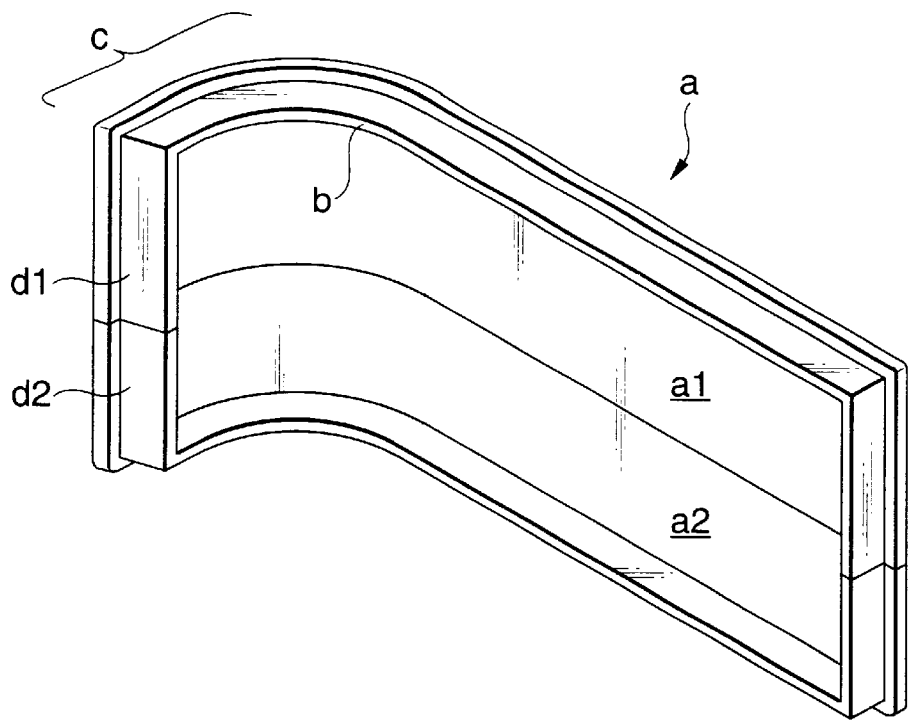
FIG. 12 is a perspective view which, when taken together with FIG. 13, shows a lens in a conventional vehicular lamp as it is seen from the back.
Figure 13:
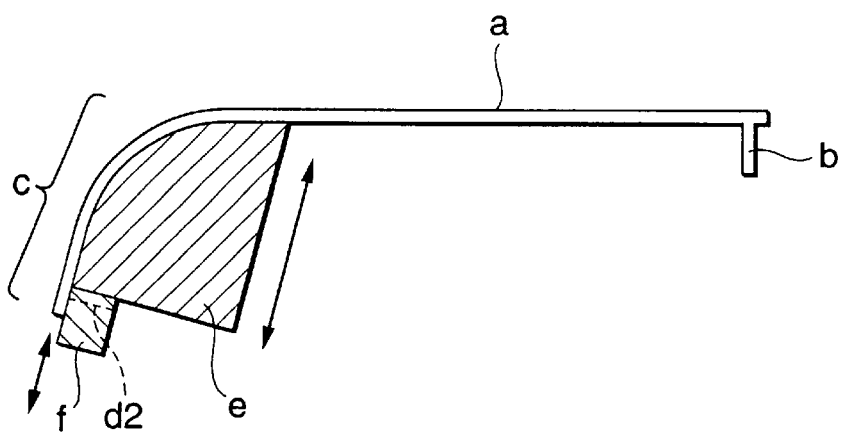
FIG. 13 shows diagrammatically how a resin of a first color is injected during lens molding.

After cooling the injected red resin, the movable die 9 is shifted to open the mold and, at the same time, the sliding mold 11 in the movable die 9 is moved to demold the shaped article, or the lens 1 for use in a vehicular lamp. See FIG. 11.

In the thus molded lens 1, those portions of the seal legs which form an undercut in the direction in which the lens is to be removed from the shaping mold are shaped only from the resin of a first color (white) and, hence, the sliding mold is necessary for shaping those portions but not for shaping the portions of the second color (red color). In other words, only one fixed die need be provided with the sliding mold. Additionally, there is no need to provide a partition of the type described in connection with the prior art. As a result, the structure of the lens shaping mold and, hence, the overall shaping process is simplified.

The shapes and structures of various parts of the lens of the invention that have been described in connection with the foregoing embodiment are intended as mere examples of implementation of the invention and they are in no way to be construed as limiting the technical scope of the invention.

As will be apparent from the foregoing description, the lens for use in a vehicular lamp according to the first aspect of the invention includes a front section directed generally to the front, a curved section extending from the front section and changing direction to face laterally, and seal legs projecting generally to the back from the peripheral edges. The seal leg in the curved section has a portion that extends inwardly to form an undercut in the direction in which the lens is removed from a lens shaping mold, and the lens is characterized in that the curved section is shaped from resin in at least two colors. The seal legs which at least form an undercut in the curved section are shaped from a resin having only one of the at least two colors.

In the lens of the invention, the seal legs in the curved section are shaped from a resin of a single color using a sliding mold and, therefore, despite the fact that the lens is a multi-colored molding, there is no need to divide the undercut in the curved section into two parts by a partition. As a result, the structure of the lens shaping mold is simplified and the efficiency and frequency of its maintenance operation is increased accordingly. This contributes to a reduction in the manufacturing cost of lenses in vehicular lamps.

According to the second aspect, the present invention provides a method of shaping a lens for use in a vehicular lamp including a front section directed generally to the front, a curved section extending from the front section and changing direction to face laterally, and seal legs projecting generally to the back from the peripheral edges, wherein the seal leg in the curved section has a portion that extends inwardly to form an undercut in the direction in which the lens is removed from a lens shaping mold. The method includes the step of injecting a resin of a first color into a mold cavity to shape a part of the lens surface in the curved section and all seal legs which at least form an undercut in the curved section. The method further includes the step of injecting a resin of a second color into the mold cavity to shape an overlying portion that covers at least a portion of the front surface of the seal legs in the curved section that have been shaped by injection of the resin of the first color.

In the inventive method, a resin of the first color shapes a part of the lens surface in the curved section and all seal legs which at least form an undercut in the curved section. Therefore, a sliding mold need be used only when injecting the resin of the first color and multi-color shaping can be accomplished without using a partition or any other means of dividing the undercut in the curved section into two parts when injecting resins of the second and any subsequent colors. As a result, the lens shaping mold and, hence, the overall shaping process is simplified, with the additional advantage of increasing the efficiency and frequency of mold maintenance operation.

According to the third aspect, the invention provides an apparatus for shaping a lens for use in a vehicular lamp including a front section directed generally to the front, a curved section extending from the front section and changing direction to face laterally, and seal legs projecting generally to the back from the peripheral edges, wherein the seal leg in the curved section has a portion that extends inwardly to form an undercut in the direction in which the lens is removed from a lens shaping mold. The apparatus comprises a first mold for shaping a resin of a first color and a second mold for shaping a resin of a second color. The first mold has a cavity for shaping a part of the lens surface in the curved section and a cavity for shaping all seal legs which at least form an undercut in the curved section. The second mold has a cavity for shaping the other parts of the curved section and a cavity for shaping an overlying portion that covers at least a portion of the front surface of the seal legs in the curved section.

Thus, the inventive apparatus shapes all undercuts in a mold for shaping a resin of the first color and, therefore, a sliding mold need be provided in only this mold for shaping a resin of the first color. Although the lens is shaped by multi-color molding, there is no need to divide the undercut in the curved section into two parts and, hence, no partition or any other separating means need be provided. As a result, the shaping mold is simplified and the efficiency and frequency of its maintenance operation.

It is contemplated that numerous modifications may be made to the lens, the method of shaping the lens, and the apparatus for shaping the lens, of the present invention without departing from the spirit and scope of the invention as defined in the following claims.

What is claimed is:

1. A lens for use in a vehicular lamp, comprising:

a front section having a front face facing a first direction;

a curved section extending from the front section and changing direction to face a second direction; and a seal leg projecting generally from a back side of each of the front and curved sections, so that said seal leg extends inwardly so that distal ends of said seal leg are closer together than basal ends of said seal leg, wherein said front section and said curved section are shaped from a resin in at least two colors and a seal leg portion which extends from said curved section is shaped from a resin having only one of said at least two colors, wherein said seal leg portion extends from an end of said curved section which is not adjacent to said front section, and wherein the second direction is substantially different from the first direction so as to define an undercut with the seal leg.

2. The lens according to claim 1, wherein a portion of the seal leg projecting from the front section is formed of a resin having a different color than a resin of the seal leg projecting from the curved section.

3. The lens according to claim 1, wherein the second direction is substantially perpendicular to the first direction.

4. A method of shaping a lens for use in a vehicular lamp that includes a front section directed generally in a first direction, a curved section extending from the front section and directed generally in a second direction, and a seal leg projecting generally from a back side of each of the front and curved sections, so that distal ends of said seal leg are closer together that basal ends of said seal leg, wherein the second direction is substantially different from the first direction so as to define an undercut with the seal leg, the method comprising the step of:

injecting a resin of a first color into a mold cavity to shape a part of a lens surface of the front and curved sections and at least a seal-leg portion which projects from the curved section; and injecting a resin of a second color into another mold cavity to shape an overlying portion that covers at least a portion of a front surface of the seal-leg portion which projects from the curved section which has been shaped by injection of the resin of the first color, wherein said step of injecting the second color also includes injecting the second color to shape at least a portion of the seal-leg which extends from the front section.

5. The method according to claim 4, wherein the second direction is substantially perpendicular to the first direction.

6. An apparatus for shaping a lens for use in a vehicular lamp that includes a front section directed generally to the front, a curved section extending from the front section and changing direction to face laterally, and seal legs projecting generally to the back from the front and curved sections, at least one seal leg having portions that extend inwardly to form an undercut in a direction in which the lens is removed from a lens shaping mold, the apparatus comprising:

a first mold for shaping a resin of a first color, wherein said first mold has a cavity for shaping a part of a lens surface and a cavity for shaping all seal-leg portions which at least form the undercut; and a second mold for shaping a resin of a second color, wherein said second mold has a cavity for shaping an overlying portion that covers at least a portion of the front surface of the seal-leg portions that form the undercut.

7. An apparatus according to claim 6, wherein said first mold has a cavity for shaping a part of the lens surface in the curved section and a cavity for shaping all seal-leg portions which at least form the undercut in the curved section.

8. An apparatus according to claim 6, wherein said second mold has a cavity for shaping a part of the lens surface in the curved section.

* * * * *